(12) United States Patent
Myers

(10) Patent No.: US 6,853,692 B2
(45) Date of Patent: Feb. 8, 2005

(54) QUADRATURE ERROR REDUCTION FOR QAM MODULATED UP OR DOWN CONVERSION

(75) Inventor: Michael H. Myers, Poway, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 506 days.

(21) Appl. No.: 09/737,219

(22) Filed: Dec. 14, 2000

(65) Prior Publication Data

US 2002/0101941 A1 Aug. 1, 2002

(51) Int. Cl.[7] ................................................. H03D 3/22
(52) U.S. Cl. ....................................................... 375/329
(58) Field of Search ................................ 375/329, 316, 375/322, 320, 261, 268; 348/725, 726, 558, 727, 461

(56) References Cited

U.S. PATENT DOCUMENTS

| 4,086,592 A | * | 4/1978 | Lewis et al. ................. 342/381 |
| 5,307,021 A | * | 4/1994 | Ishizeki ....................... 329/308 |
| 6,496,229 B1 | * | 12/2002 | Limberg ....................... 348/725 |

* cited by examiner

*Primary Examiner*—Khai Tran
(74) *Attorney, Agent, or Firm*—Katten Muchin Zavis Rosenman; John S. Paniaguas

(57) ABSTRACT

A compensation circuit for phase modulation systems, such as QPSK and QAM systems, which compensates for phase errors in the I and Q components of the QPSK or QAM signals to minimize carry over of such phase errors in analog up and down conversions of such signals. In particular, the invention relates to a relatively simple circuit, which compensates for channel phase errors by providing a direct correction of one of the channels based on the measured correlation between the I and Q components, which should ideally be 0. As such, cross talk between I-Q channels is minimized, which improves the signal-to-noise ratio of transmitted and received QPSK or QAM signals.

8 Claims, 2 Drawing Sheets

US 6,853,692 B2

QUADRATURE ERROR REDUCTION FOR QAM MODULATED UP OR DOWN CONVERSION

BACKGROUND OF THE INVENTION

1. Field of the Invention

The present invention relates to a compensation circuit for quadrature amplitude modulation (QAM) signals and more particularly to a circuit for compensating for any phase errors in the I and Q components of QAM signals to reduce carryover of such phase errors in analog up and down conversions of such signals.

2. Description of the Prior Art

Various modulation techniques are known for modulating a carrier signal with various types of information. Due to limited bandwidth allocations in some applications, modulation techniques have been developed to increase the amount of information that can be transmitted per frequency. One such technique is known as quadrature phase shift keying (QPSK). Such QPSK modulation techniques are known in the art and described in U.S. Pat. Nos. 5,440,259; 5,615,230; 5,440,268; 5,550,868; 5,598,441; 5,500,876; and 5,485,489, hereby incorporated by reference. In general, with such a modulation technique, the phase of both the real and quadrature (I-Q) components of the carrier are modulated in order to enable two bits, each having two states, to be transmitted over a single frequency. As such, at each frequency, the carrier can be modulated into one of four different states, known as symbols, which form what is known as a constellation. The QPSK modulation technique is thus able to provide twice the information per frequency, relative to other amplitude and frequency techniques, making it suitable for applications where bandwidth allocations are relatively limited, for example, in satellite communications systems.

In order to further increase the amount of information transmitted per frequency, other modulation techniques have been developed, such as quadrature amplitude modulation (QAM). Such QAM modulation techniques are relatively well known in the art. Examples of such QAM modulation circuits are disclosed in commonly owned copending U.S. patent application Ser. No. 09/175,790, filed on Oct. 20, 1998, as well as U.S. Pat. Nos. 5,612,651; 5,343,499; 5,363,408; and 5,307,377, hereby incorporated by reference. Such QAM modulation techniques essentially involve amplitude modulation of the QPSK signal to provide constellations of symbols of 8, 16, 32 and 64 and more per frequency.

Such QPSK and QAM modulation techniques are used for transmission of information at RF frequencies in various communication systems, such as military and commercial communication systems. In such systems QAM modulated signals are known to be up converted from baseband to RF frequencies for transmission. Unfortunately, any phase error in the I-Q components of the QAM signals, for example, due to hardware imperfections, results in I-Q cross talk, known to degrade the signal-to-noise ratio (SNR) of the transmitted signal. Similarly, down conversion of phase modulated signals from RF frequencies to baseband are also subject to I-Q cross talk which also results in a degraded SNR of the received signals. In addition, if the up or down conversions are accomplished utilizing analog techniques, for example, as in analog radios, additional problems may result due to equipment aging and temperature drift, which can cause the orthogonality of the I-Q components to vary, possibly degrading the conversion process. Thus, there is a need to compensate phase errors in the I and Q components of QAM modulated signals.

SUMMARY OF THE INVENTION

Briefly, the present invention relates to a compensation circuit for phase modulation systems, such as QPSK and QAM systems, which compensates for phase errors in the I and Q components of the QPSK or QAM signals to minimize carry over of such phase errors in analog up and down conversions of such signals. In particular, the invention relates to a relatively simple circuit, which compensates for channel phase errors by providing a direct correction of one of the channels based on the measured correlation between the I and Q components, which should ideally be 0. As such, cross talk between I-Q channels is minimized, which improves the signal-to-noise ratio of transmitted and received QPSK or QAM signals.

DESCRIPTION OF THE DRAWINGS

These and other advantages of the present invention will be readily appreciated with reference to the following specification and attached drawings, wherein.

DETAILED DESCRIPTION OF THE INVENTION

As discussed above, in order to increase the amount of information that can be transmitted for a given frequency, the carrier signal is broken down into real (I) and quadrature (Q) components or channels. Ideally, these channels should be exactly 90 degrees apart. Unfortunately, due to imperfections in the hardware used to implement such QPSK or QAM modulation techniques, the I and Q channels are not exactly 90 degrees apart, which results in phase errors causing I-Q cross talk between the channels, resulting in signals with a degraded signal-to-noise ratio (SNR). Although systems are known for canceling the phase error, these systems use digital techniques to compensate phase errors at the baseband level prior to up conversion to RF frequencies for transmission. An example of such a system is disclosed in U.S. Pat. No. 5,500,876, hereby incorporated by reference. However, such systems are not useful in communication systems in which the up conversion, or down conversion, is accomplished, utilizing conventional analog techniques.

The system, in accordance with the present invention, provides phase compensation, which, as will be discussed below, allows for phase errors between the I and Q channels of a phase modulation system, such as QAM or QPSK, to be up to 30 degrees while still providing acceptable results. The circuit essentially multiplies the I and Q channels and averages the result in order to develop a compensation signal. The compensation signal in turn is used to cancel the effects of the non-orthogonality.

Figure 1:
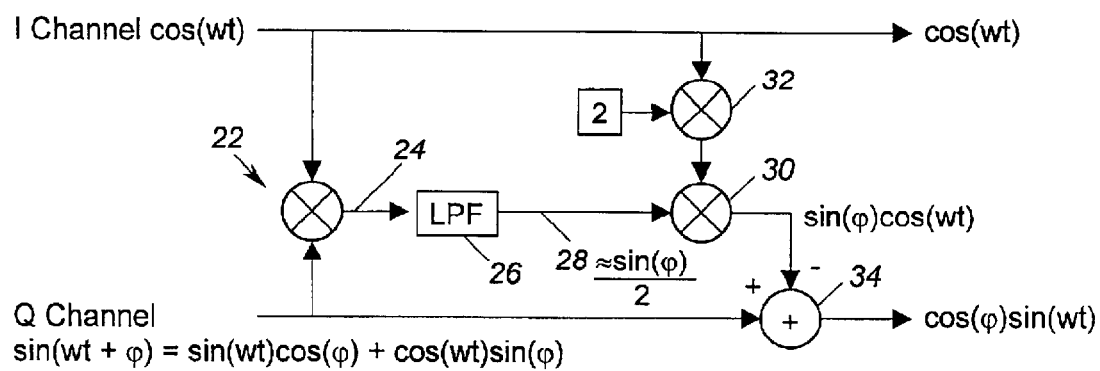
FIG. 1 is a block diagram of the compensation circuit, in accordance with the present invention.

Referring to FIG. 1, the I and Q channels are represented as $\cos(\omega t)$ and $\sin(\omega t+\psi)$, respectively. The term $\psi$ is used to represent the phase error. In an ideal situation, the I and Q channels are exactly 90 degrees apart. However, due to hardware imperfections, a small error $\psi$ is assumed, for example, in the Q channel. The circuit illustrated in FIG. 1 directly corrects the Q channel, such that the I and Q channels are essentially 90 degrees apart. In particular, both the I and Q channel signals, cos(ωt) and sin(ωt+ψ), respectively, are applied to a first multiplier 22. The output of the multiplier 22 is on line 24. The output signal on line 24 is developed below. In particular, the Q channel signal, including the phase error ψ can be represented as illustrated in equation (1) below using a simple trigonometric expansion.

$$\sin(\omega t+\psi)=\sin(\omega t)\cos(\psi)+\cos(\omega t)\sin(\psi) \quad (1)$$

By multiplying the Q channel signal sin(ωt+ψ) by the I channel signal cos(ωt), the result of the multiplication is as illustrated in equation (2), below:

$$\sin(\omega t+\psi)\cos(\omega t)=\sin(\omega t)\cos(\omega t)\cos(\psi)+\cos^2(\omega t)\sin(\psi) \quad (2)$$

The signal on line 24 is averaged by an averaging circuit, such as a low pass filter (LPF) 26. Assuming the phase error ψ is constant over the time period (T), the phase error ψ is expected to change relatively slowly, due to thermal drift. Thus, the output of the low pass filter 26 on line 28 may be approximated by equation (3), below:

$$\sin(\omega t+\psi)\cos(\omega t) \approx \sin(\psi)/2 \quad (3)$$

$$\sin(\omega t + \psi)\cos(\omega t) = \overbrace{\sin(\omega t)\cos(\omega t)\cos(\psi)}^{TERM\ A} + \overbrace{\cos^2(\omega t)\sin(\psi)}^{TERM\ B} \quad (a)$$

$$\text{AVERAGE}(a): \overline{TERM\ A} \approx 0;\ \overline{TERM\ B} \approx \frac{\sin(\psi)}{2} \quad (b)$$

This signal, sin(ψ)/2, is used to develop a compensation signal for the Q channel. In addition, the output of the low pass filter 26 is manipulated to cancel the cos(ωt) sin(ψ) portion of the Q channel signal. In particular, the I channel signal cos(ωt) is multiplied by 2 by way of a multiplier 32 to develop a second product signal. The second product signal, in turn, is multiplied by the output signal from the low pass filter 26 by way of a third multiplier 30 to generate a third product signal. The output of the multiplier 30 is a signal sin(ψ)cos(ωt). This signal sin(ψ)cos(ωt) is applied to an inverting input of a summer 34, along with the Q channel signal sin(ωt+ψ) to produce an output signal as set forth in equation (4).

$$Q\ channel=\cos(\psi)\sin(\omega t) \quad (4)$$

The I channel is represented as the signal cos(ωt) as shown in FIG. 1. In accordance with the present invention, the Q channel signal is represented as cos(ψ)sin(ωt). The term cos(ψ) provides a correction of the amplitude of the Q channel signal to compensate for the original phase error.

Figure 2:
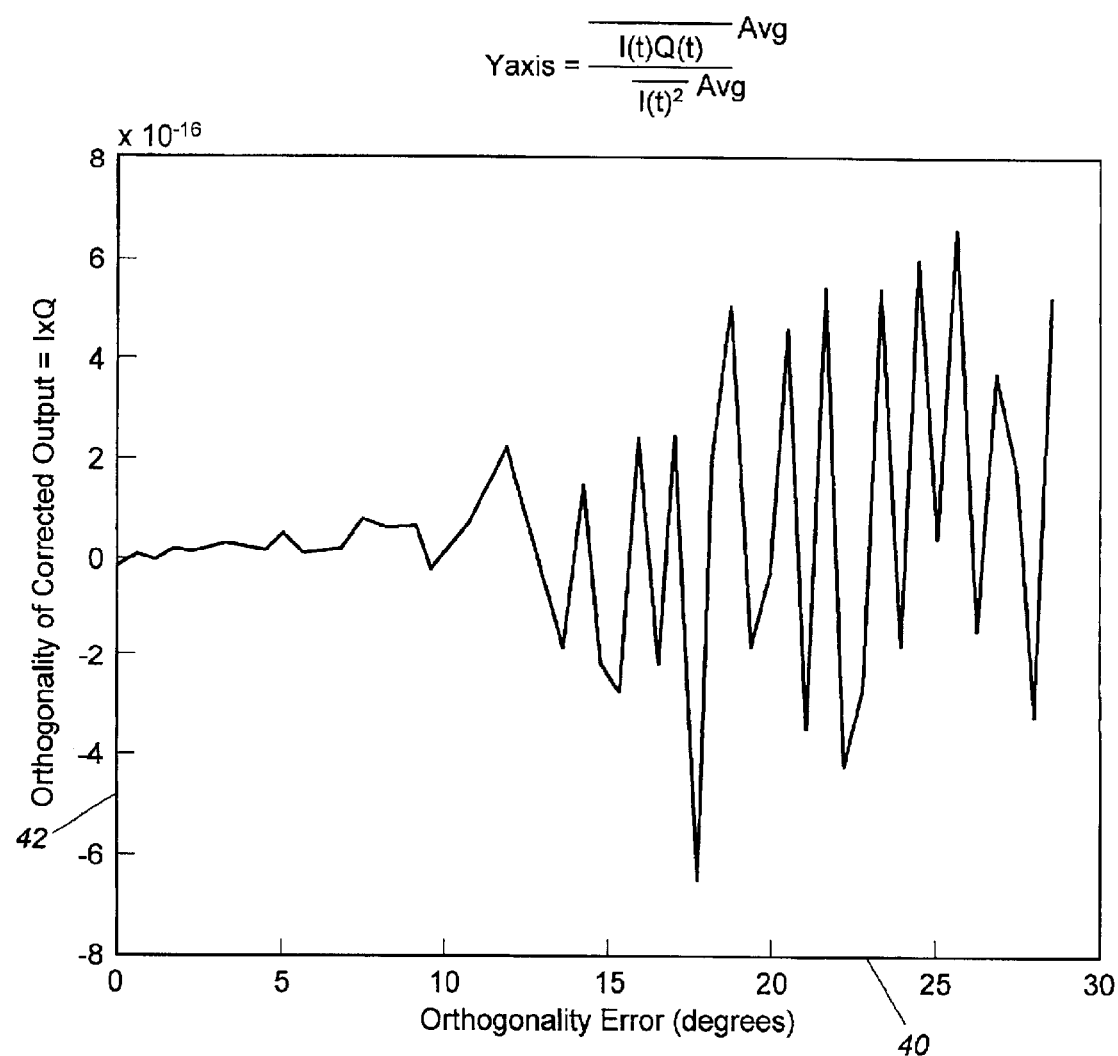
FIG. 2 is a graphical illustration of the corrected output of the system as a function of the orthogonal phase errors up to 30 degrees.

FIG. 2 illustrates that the system described and illustrated above can be used to compensate for phase errors up to 30 degrees. In particular, the horizontal axis 40 illustrates phase errors between the I and Q channels from 0 to 30 degrees. The vertical axis 42 illustrates the orthogonality or I×Q product of the corrected output signals, using the system in accordance with the present invention. As shown for phase errors between the I and Q channels, the compensated output signals are well within acceptable limits (±8×10⁻¹⁶).

Obviously, many modification and variations of the present invention are possible in light of the above teachings. For example, thus, it is to be understood that, within the scope of the appended claims, the invention may be practiced otherwise than as specifically described above.

What is claimed and desired to be secured by Letters Patent of the United States is:

1. A system for compensating for phase errors in the real and quadrature channels of a phase modulation system comprising:

an I input channel for receiving the real (I) components of a signal;

a Q input channel for receiving the quadrature (Q) components of a signal;

a compensation circuit for multiplying said I channel and Q channel signals to develop a first product signal and averaging said product signal to generate a compensated channel signal;

said compensation circuit including a first multiplier for multiplying said I channel signal and said Q channel signal together to generate said first product signal and a time averaging circuit for time averaging said first product signal; and a second multiplier for multiplying said I channel signal by a predetermined constant to define a second product signal.

2. The system as recited in claim 1, further including a third multiplier for multiplying said first and second product signals to generate a third product signal.

3. The system as recited in claim 2, further including a summer for summing said Q channel signal with said third product signal, wherein said Q channel signal is applied to a non-inverting input of said summer and said third product signal is applied to an inverting input of said summer to generate a compensated Q channel signal.

4. The system as recited in claim 3, wherein said compensated Q channel signal includes a compensation factor which is a function of said phase error.

5. The system as recited in claim 4, wherein said compensated Q channel signal is the compensation factor multiplied by sin(ωt).

6. The system as recited in claim 5, wherein said compensation factor is cos(ψ).

7. A method for compensating for phase error in the real (I) and quadrature (Q) channels of a phase modulation system comprising the steps of:

(a) multiplying the I channel signal and the Q channel signal together to develop a first product signal;

(b) averaging the product signal over time, defining a time averaged product signal;

(c) generating a compensated Q channel signal based upon said time averaged product signal; and (d) multiplying said time averaged product signal by a multiple of said I channel signal to generate a second product signal.

8. The method as recited in claim 7, including subtracting said second product signal from said Q channel signal.

* * * * *